United States Patent [19]

Waters

[11] 4,364,893
[45] Dec. 21, 1982

[54] MOLD ATMOSPHERE CONTROL SYSTEM

[75] Inventor: Michael A. Waters, Elk Grove Village, Ill.

[73] Assignee: Application Engineering Corporation, Elk Grove Village, Ill.

[21] Appl. No.: 273,904

[22] Filed: Jun. 15, 1981

[51] Int. Cl.³ .......................... B30B 11/02; B29C 3/00
[52] U.S. Cl. ..................................... 264/325; 425/73; 425/3
[58] Field of Search ................. 425/3, 73, 78; 264/85, 264/325

[56] References Cited

U.S. PATENT DOCUMENTS

| | | | |
|---|---|---|---|
| 3,303,533 | 2/1967 | King | 425/78 |
| 3,521,326 | 7/1970 | Rice et al. | 425/78 |
| 3,732,056 | 5/1973 | Eddy et al. | 425/78 X |
| 3,832,107 | 8/1974 | Cox et al. | 425/73 X |
| 4,005,956 | 2/1977 | Inoue | 425/78 |
| 4,140,453 | 2/1979 | John | 425/73 X |
| 4,279,580 | 7/1982 | Hayashi et al. | 425/73 X |

Primary Examiner—J. Howard Flint, Jr.
Attorney, Agent, or Firm—Kinzer, Plyer, Dorn & McEachran

[57] ABSTRACT

A method and apparatus for maintaining a dehumidified atmosphere or other controlled atmosphere around the mold of a reciprocating-platen molding press, in which a sheet of light weight flexible material, preferably a transparent plastic film, is mounted on the platens, as by a plurality of permanent magnets, to form an open bottom tent enclosing both halves of the mold. For a dehumidified atmosphere, a dehumidifier generates a stream of warm dry air that is continuously discharged into the tent, from locations adjacent each platen, with a volume sufficient to maintain the tent inflated for all platen positions despite continuing air loss through the open bottom of the tent. The dehumidifier preferably uses a chilled water supply that is also employed to cool the molds in order to obtain automatic dew point correction. For other atmospheres, an appropriate source is substituted for the dehumidifier.

21 Claims, 7 Drawing Figures

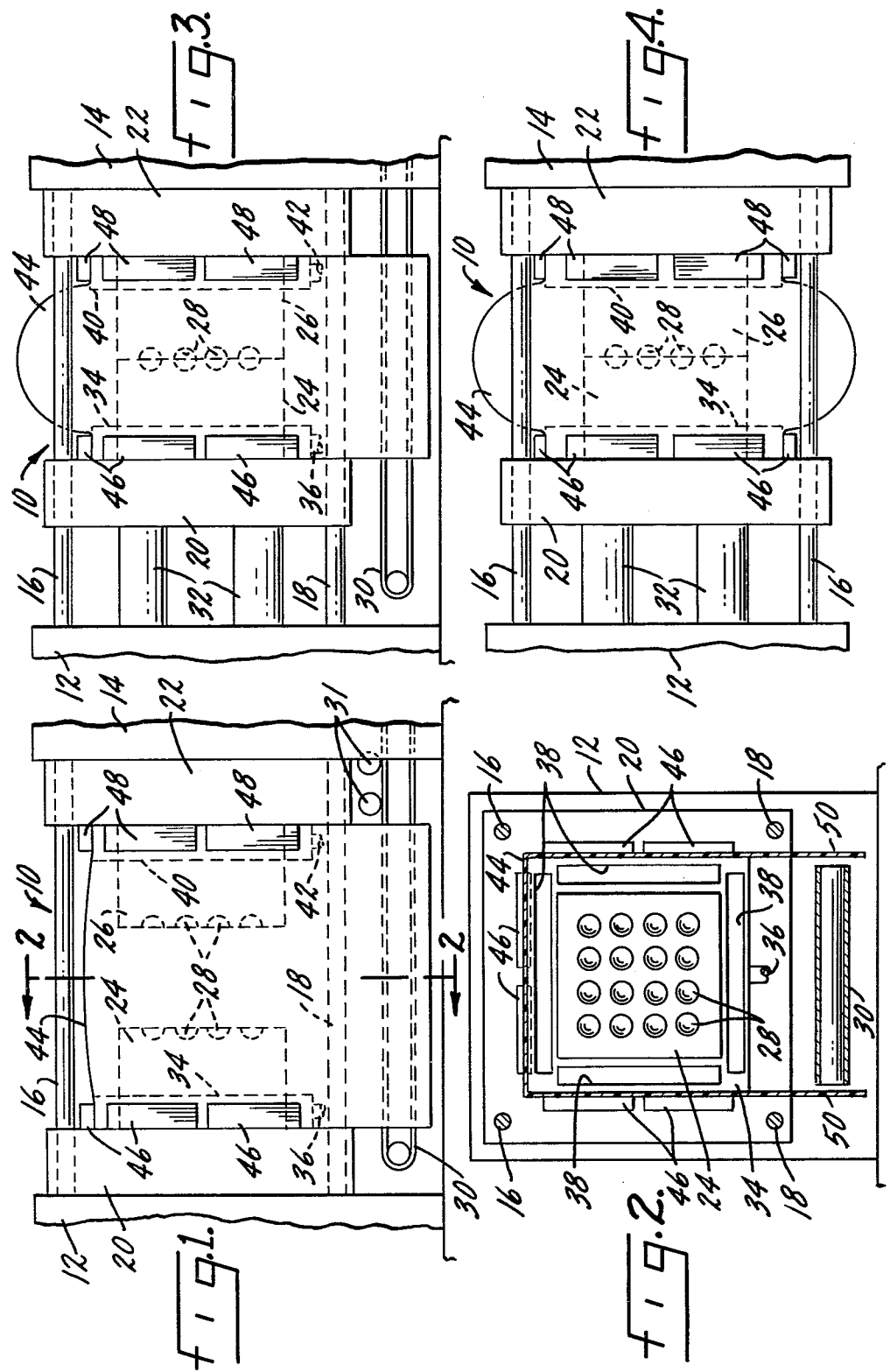

MOLD ATMOSPHERE CONTROL SYSTEM

BACKGROUND OF THE INVENTION

The molds employed in the presses used for molding articles of plastic, rubber, elastomer, and other moldable materials are usually fabricated from mild steel. Stainless steel is not usually satisfactory, primarily because it does not have suitable heat transfer characteristics. The molds are usually cooled by chilled water flowing through passages formed in both halves of the mold assembly.

Any water condensation forming on the external surfaces of a mold of this kind is highly undesirable. The external surfaces of the mold halves are relatively cool, often only a few degrees above the temperature of the chilled water employed to cool the mold. Consequently, whenever the mold halves come into contact with moist ambient air, which is typical of the atmosphere in a molding plant, condensation is likely. This is particularly true in summer months or in warm climates. This condensation leads to rust formation on the externalFcavities will ruin the molded articles.

For most molding operations, therefore, it is highly desirable to maintain a dry atmosphere around the mold halves at all times. Moreover, this should be a warm atmosphere. Chilling the air around the mold is not desirable because this changes the thermal conditions for the molding process and tends to disrupt that process.

One rather obvious solution to this problem is to air condition the room in which the molding press is located. Expense, however, is usually an effective bar to this expedient. A number of proposals have been advanced to maintain a controlled atmosphere around the molds, using some sort of enclosure that is limited to the molding station of the press. If a fixed enclosure is employed, totally enclosing the entire molding station, however, the enclosure interferes with observation and servicing of the molds and other components of the molding station. On the other hand, if the enclosure is limited to the mold halves and their supporting platens, the expansion of the enclosure that occurs when the mold is opened to discharge molded products draws ambient air into the enclosure, so that the moisture condensation problem is not effectively eliminated. Furthermore, in most instances the enclosure requires extensive modification of the molding station of the press, which is undesirable from the standpoint of cost and may interfere with normal functioning of the press.

In most of the presses used in the plastic and elastomer molding industries, the opening of the two halves of the mold at the end of a molding cycle is followed by immediate discharge of the molded products from the molds. The molded products fall to the bottom of the molding station, into some form of product handling apparatus. This product handling apparatus may be a conveyor for transporting the molded products to an external sorting location. In other instances, the product handling apparatus may comprise an inlet hopper for a parts separator located adjacent to the press. In its simplest form, the product handling apparatus may comprise a receptacle for catching the molded products as they are discharged from the molds.

For any such product handling apparatus, there is often a tendency to lose some of the molded products. This is particularly true for multi-cavity molds employed in the manufacture of small molded parts such as container caps, syringe caps, and the like. Recovery of these parts is time consuming to a wasteful degree.

In many molding presses, the lubrication systems for the press components tend to leak or "weep", particularly from seals or bearing surfaces. If the lubricants contact the molded products, undesirable contamination results. The problem is particularly acute for molded products intended for food and drug use. For example, with molded products intended for use in medical appliances such as syringes, inadequate control of the products on discharge from the molds, resulting in contact with lubricants from the press or with other non-sterile materials, may create a need for subsequent cleaning and sterilization, increasing overall costs.

SUMMARY OF THE INVENTION

It is a primary object of the invention, therefore, to provide a new and improved mold atmosphere control system that effectively maintains a controlled atmosphere, such as a dry, warm air atmosphere, around the mold halves of a reciprocating molding press at all times, throughout the molding cycle, with only minimal modification of the press apparatus, and that is economical in construction and in operation.

A further object of the invention is to provide a new and improved mold atmosphere control system for a reciprocating molding press that incorporates an enclosure around the reciprocating elements of the press, which enclosure undergoes only a minimum change of volume between the open and closed conditions of the press.

Another object of the invention is to provide a new and improved mold atmosphere control system for a molding press that allows full and effective observation of the molding operation at all times and that further assists in controlling discharge of molded products from the press, assuring collection of those molded products by a product handling apparatus located beneath the molding station of the press.

Accordingly, in one aspect the invention relates to a mold atmosphere control system for a molding press of the kind comprising two platens, each bearing a mold half, cyclically movable between a closed molding position in which the mold halves are closed upon each other and an open discharge position in which the mold halves are substantially displaced from each other. The system comprises a tent formed of flexible sheet material and mounting means for mounting the tent on the platens of the press with the tent substantially enclosing the mold halves except for a bottom opening large enough to allow discharge of molded products formed in the press. A gas diffuser is mounted on one of the platens, within the tent; gas supply means, connected to the diffuser, continuously supplies a stream of gas, under pressure, flowing through the diffuser into the tent and out through the bottom opening, the gas stream having a volume sufficient to maintain the tent inflated and throughout the mold cycle of the press.

In another aspect, the invention relates to a method of maintaining a controlled atmosphere encompassing the mold halves of a molding press of the kind including a molding station comprising two platens, each bearing a mold half, which platens move cyclically between a closed molding position in which the mold halves are closed upon each other and an open discharge position in which the mold halves are substantially displaced from each other. The method comprises mounting a sheet of relatively light weight flexible sheet material on the two platens to form a tent extending between the platens and enclosing both mold halves, the bottom of the tent being open to permit discharge of gas and of products molded in the press. A stream of gas of controlled characteristics, under pressure, is generated and is continuously discharged into the interior of the tent in sufficient volume to maintain the tent inflated throughout the molding cycle, despite substantial continuing gas loss through the open bottom of the tent, thereby maintaining a controlled atmosphere encompassing the mold halves.

BRIEF DESCRIPTION OF THE DRAWINGS

FIG. 1 is a side elevation view of the molding station of a reciprocating molding press equipped with a mold atmosphere control system constructed in accordance with a preferred embodiment of the present invention, the molding station being shown in its open discharge condition;

FIG. 2 is a sectional elevational view taken approximately along line 2—2 in FIG. 1;

FIG. 3 is a side elevation view, similar to FIG. 1, showing the press in its closed molding condition;

FIG. 4 is a plan view showing the molding station of the press in closed condition;

DESCRIPTION OF THE PREFERRED EMBODIMENT

Figure 5:
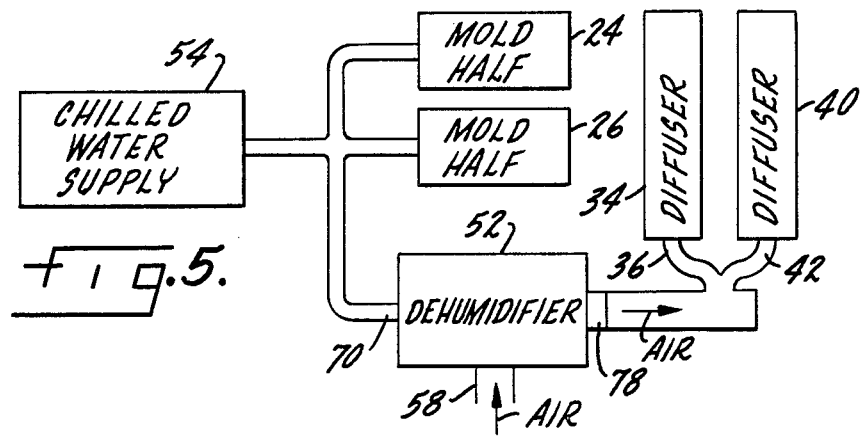
FIG. 5 is a schematic illustration of the preferred arrangement for connecting a dehumidifier to the apparatus of FIGS. 1–4.

FIGS. 1–4 illustrate, in somewhat simplified form the molding station 10 of a conventional molding press of the kind employed to manufacture molded products of resin, rubber, elastomer, and like moldable materials. Only the molding station itself is shown; the remainder of the press is not involved in the present invention.

The molding station 10, as shown in FIGS. 1–4, includes two fixed frame and housing portions 12 and 14 of the press, spaced from each other at opposite sides of the molding station. Two tie bars 16 extend across the top of the molding station between frame sections 12 and 14. Two similar tie bars 18 extend across the bottom of the molding station 10. A movable platen 20 is mounted in sliding relation on the tie bars 16 and 18 at the left hand side of molding station 10 as seen in FIGS. 1, 3 and 4. A fixed platen 22 is mounted on the press frame 14 at the right hand side of the molding station 10.

In FIGS. 1–4, a first mold half 24 is shown mounted on the movable platen 20. A second mating mold half 26 is mounted on the fixed platen 22. The two mold halves 24 and 26 are of conventional construction, formed of mild steel, and provide a plurality of mating mold cavities 28. The two mold halves 24 and 26 include the usual internal cooling passages (not shown) through which chilled water is circulated to cool the molds during operation. A product handling apparatus shown as a conveyor 30 is positioned at the bottom of molding station 10. It should be understood that the conveyor 30 is exemplary only and that the product handling apparatus at the bottom of the molding station may comprise the inlet to a parts separator or, in its simplest form, could constitute simply a pan for receiving molded products produced by the press.

The operation of molding station 10, as thus far described, is quite conventional, so that only a brief description is required. In the course of a molding cycle, the movable platen 20 is driven to the right hand side of molding station 10, by means of the piston rods 32, to the closed molding position shown in FIGS. 3 and 4, with the two mold halves 24 and 26 closed upon each other to join the mold cavities 28. With the mold closed, the required quantities of resin, rubber, elastomer, or other like moldable material is molded to the desired configuration in the mold cavities 28.

When the molding of these products is completed, the movable platen 20 is shifted, again by means of the piston rods 32, to the left hand side of the molding station 10. This places the molding apparatus in its open discharge position, with the two mold halves 24 and 26 substantially displaced from each other (FIG. 1). At this position, the molded products 31 are discharged downwardly onto the product handling conveyor 30 and removed from the press, following which a new molding cycle is initiated.

The mold atmosphere control system of the present invention is most frequently employed to maintain a dehumidified air atmosphere around the mold halves 24 and 26; the embodiment shown in the drawings is a system of that kind. The portion of the mold atmosphere control system of the present invention shown in FIGS. 1–4 includes a first air diffuser 34 that is mounted on the movable platen 20. As shown in FIGS. 1 and 2, the air diffuser 34 is mounted in encompassing relation to the first mold half 24. It includes an air inlet 36 and a plurality of air outlets 38 used to discharge an air stream around the periphery of mold half 24 as described more fully hereinafter. A second air diffuser 40 is mounted on the fixed platen 22 in encompassing relation to the second mold half 26. The air diffuser 40 has an air inlet 42 and is provided with a plurality of air outlets around the periphery of the mold half, the construction being essentially the same as shown for the first air diffuser 34. The diffusers 34 and 40 need not extend entirely around the mold halves 24 and 26, as shown; diffusers having at least two outlets, on opposed sides of each mold half, are preferred, however.

The part of the mold atmosphere control system that is shown in FIGS. 1–4 further comprises a sheet of thin flexible material 44 which extends between the two platens 20 and 22. Mounting means are provided for mounting the flexible sheet 44 on the two platens to form a tent that substantially encloses the two mold halves 24 and 26, except for a bottom opening large enough to allow discharge of the molded products 31 and to discharge air out the bottom of the tent. In the illustrated embodiment, this mounting means includes a plurality of elongated permanent magnets 46 disposed along the outer surface of the left hand end of the tent sheet 44, each magnet holding a portion of this end of the tent on the movable platen 20 by magnetic attraction to the diffuser 34 or to the platen 20, or to both. The tent mounting arrangement is the same at the fixed platen 22. This, a plurality of elongated permanent magnets 48 are disposed along the outer surfaces of the right hand end of the tent sheet 44, each of these magnets holding a portion of that end of the tent on the fixed platen 22 or its associated air diffuser 40 by magnetic attraction.

The permanent magnet mounting means illustrated in FIGS. 1–4 is advantageous because it facilitates rapid and convenient mounting of the tent 44 on the platens 20 and 22 of the molding press without requiring special shaping or cutting of the tent material, apart from cutting the tent sheet to match its width approximately to the maximum displacement between the two platens as shown in FIG. 1. This magnetic mounting arrangement also makes it unnecessary to affix any fasteners to the tent sheet itself, or to the platens or the air diffusers. On the other hand, other fastening means, such as a multiplicity of snap fasteners or mating strips of multi-hook fastener material of the kind sold under the trade name Velcro, can be used if desired.

In the preferred construction shown in FIGS. 1–3, the lower edges 50 of the tent sheet 44 extend downwardly well below the bottoms of the two platens 20 and 22, alongside the opposite edges of the product handling apparatus, the conveyor 30. These lower edges 50 of the tent 44 are of material assistance in confining the downwardly moving molded products 31 when discharged from the molding station 10, assuring deposit of the molded products on the conveyor 30 without appreciable loss. Of course, the lower edges 50 of the tent 44 can serve the same purpose for other types of product handling apparatus when substituted for the conveyor 30.

FIG. 5 provides a schematic illustration of additional operating components of the mold dehumidification system. As shown therein, the two air diffusers 34 and 40 have their air inlets 36 and 42 connected to the outlet of a dehumidifier 52. In the preferred arrangement shown in this figure, the dehumidifier 52 is supplied with chilled water from a source 54 that also constitutes a supply of chilled water for cooling the two mold halves 24 and 26.

Figures 6, 7:
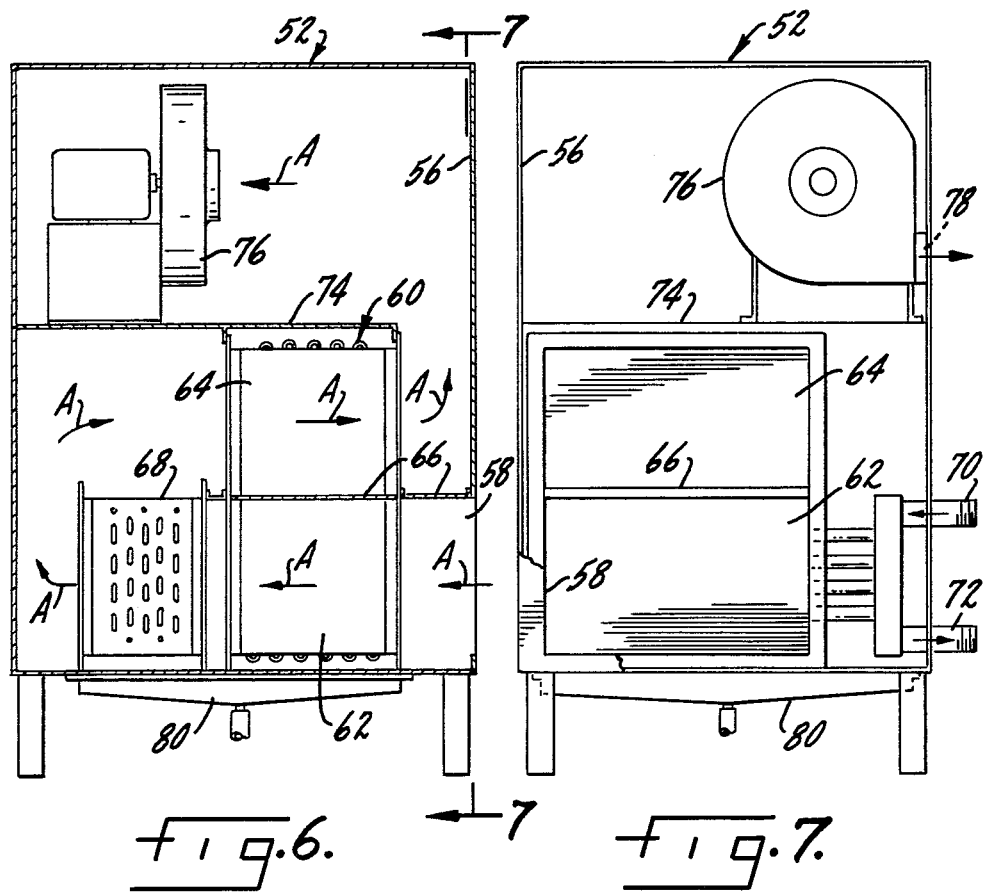
FIG. 6 is a side elevation view of a preferred form of dehumidifier used in the system of FIGS. 1–5, with the side of the dehumidifier housing removed.
FIG. 7 is a sectional elevational view of the dehumidifier taken approximately along line 7—7 in FIG. 6.

A preferred construction for the dehumidifier 52 is shown in FIGS. 6 and 7. The dehumidifier includes a housing 56 having an air inlet 58 located at the bottom of one end of the housing. The air inlet 58 communicates with a lower evaporator section 62 of a passive refrigerant coil 60. This lower section 62 of coil 60 is separated from an upper condenser section 64 by a barrier 66 through which the individual elements of the coil 60 extend. The barrier 66 extends further into the housing 56, beyond the evaporator section 62 of the passive coil 60, to a dehumidifying coil 68. The dehumidifying coil 68 is supplied with chilled water through an inlet 70, the water being discharged from the coil through an outlet 72.

The dehumidifier 52, as shown in FIGS. 6 and 7, further comprises a blower 76 mounted above a barrier 74 in the upper portion of the housing 56. Blower 76 has an outlet 78 that is connected to the inlets 36 and 42 of the diffusers 34 and 40 (See FIG. 5).

In considering the operation of the mold atmosphere control (dehumidification) system, it is convenient to start with the dehumidifier 52, FIGS. 5–7. The blower 76 draws air into the housing 56 through the opening 58; the air passes first through the evaporator section 62 of the passive refrigerant coil 60, then through the dehumidifying coil 68, through the condenser section 64 of coil 60, and out through the outlet opening 78. The path of the air is generally indicated, in FIG. 6, by the arrows A.

In the dehumidifier 52, the warm, wet ambient air entering the dehumidifier first heats the refrigerant in the lower evaporator section 62 of the passive coil 60. This provides some preliminary cooling of the air. The evaporated refrigerant moves by convection into the upper condenser section 64 of the coil 60.

The incoming air, which is still fairly warm and quite wet, next passes through the condensing or dehumidifying coil 68 which, as noted above, is chilled by a continuing flow of chilled water from the supply 54 (FIG. 5). Consequently, the air is brought to a substantially lower temperature and moisture entrained in the air is condensed, flowing downwardly into a drip pan 80.

From the dehumidifying coil 68, the air flows into and through the upper condenser section 64 of the passive refrigerant coil 60. As the air flows through the condenser section 64, it is heated back to a temperature acceptable for use as a mold atmosphere. As the air passes through the condenser section 64 of the coil 60, it cools the vaporized refrigerant, which condenses and flows back down into the lower evaporator section 62 of the coil. The blower 76 supplies some additional heat to the air stream. The air flowing out of the outlet 78 of the dehumidifier 52 is warm and dry, and has been brought to this condition with a minimum of energy input to the dehumidifier.

A typical set of operating conditions for the air stream passing through the dehumidifier 52 may be as follows:

| | |
|---|---|
| Entering inlet 58: | 100° F. dry bulb |
| | 75° F. wet bulb |
| Entering coil 68: | 60° F., saturated |
| Entering section 64: | 40° F., dry |
| Leaving, outlet 78: | 80° F., dry |

The stream of warm dry air generated by the dehumidifier 52 flows into the two diffusers 34 and 40 through their inlets 36 and 42 and out into the tent 44 (FIGS. 1–5). The volume of the air stream discharged into the tent through the two diffusers should be great enough to maintain the tent 44 inflated at all times, regardless of whether the molding apparatus is in the closed molding position of FIGS. 3 and 4 or the open discharge position of FIG. 1. As a consequence, the tent 44 provides a warm, dry atmosphere around the two mold halves 24 and 26 at all times, precluding any condensation of moisture on the mold halves. For most molding presses, an air stream flowing at a rate of 400 cubic feet per minute is quite adequate; a dehumidifier with this capacity will serve for a wide range of molding presses.

A variety of different materials can be used for the tent 44. Virtually any light weight flexible sheet material is suitable. The preferred material, however, is a thin plastic film that is at least partially transparent. For example, the material from which the tent 44 is fabricated may comprise low density clear polyethylene film, preferably of a thickness of at least five mils. By using this kind of material for the tent 44, observation of the operation of the molding station 10 is maintained essentially unimpeded by the mold dehumidification system. Nevertheless, this material is strong enough and flexible enough to serve efficiently as a confining tent for the system. Furthermore, the cost is low enough so that the tent can be replaced periodically, as on a weekly basis, without undue economic loss.

The system of the invention, when used for dehumidification, can employ other forms of dehumidifier, substantially different from that described in connection with FIGS. 6 and 7. For example, a dehumidifier that provides for condensation of moisture in the ambient air by means of a refrigerant coil, with electrical heating of the air after it passes through the coil, could be utilized. It is quite advantageous, however, to use some form of dehumidifier in which the coil for condensation of moisture from the air is chilled by the same chilled water supply employed to cool the molds. By using this arrangement, as shown in FIG. 5, automatic compensation for dew point changes, which might occur as the result in changes of the temperature of the cooling water supplied to the molds, is effectively achieved. Thus, if the temperature of the external surfaces of the mold halves increases somewhat, due to a rise in temperature of the chilled water used to cool the mold halves, a similar change is permissible as regards the air stream supplying the dehumidification apparatus. By the same token, any reduction in the temperature of the cooling water to the molds is automatically compensated by a corresponding reduction in the temperature of the dehumidifying airstream.

From the foregoing description, it will be apparent that the mold atmosphere control system of the present invention requires minimal modification of the molding press with which it is employed. Basically, that modification constitutes the mounting of the two diffusers 34 and 40 on the platens of the press, and the mounting of the tent 44 on the diffusers or directly onto the platens. In all other respects, the press apparatus remains unchanged.

The tent 44, because it is maintained continuously inflated at all times, does not change markedly in volume due to the changes in platen positions that occur between the open and closed positions of the press. That is, when the press is closed, as shown in FIGS. 3 and 4, the outward bulging of the tent 44 maintains the internal volume quite close to that presented when the press is in its open condition as shown in FIG. 1. Accordingly, when the press moves from closed to open position, there is no increase in volume within the tent sufficient to draw ambient air into the interior of the tent, and the dehumidifying atmosphere is maintained in the tent at all times. Nevertheless, the apparatus required for the system is quite inexpensive. Futhermore, when a transparent tent is employed, full visual access to the molding equipment is maintained throughout the molding cycle. The improved control of the discharge of molded products provided by the downwardly extending edges 50 of the tent 44 is also of substantial value.

In some instances, an atmosphere other than dehumidified air, encompassing the molding station of a reciprocating press, is necessary or desirable. The system of FIGS. 1-5 can be readily adapted to an application of this kind. The principal change required is the incorporation of an appropriate gas supply in the system, as a substitute for dehumidifier 52 or as an input supply for the dehumidifier. The gas employed might, for example, constitute carbon dioxide or nitrogen, or any other appropriate gas.

A modified system employing a gas other than air may present appreciable problems of operator health and safety if the bottom of tent 44 is left open to the ambient atmosphere as shown. A similar problem is presented in the molding of products from materials that may release toxic fumes or gases as an incident to the molding process. In such situations, a partial closure may be connected to the lower edges 50 of tent 44, with an appropriate outlet to remove the air or gas from the tent for safe disposal. The construction of such a partial exhaust enclosure (not shown) can be varied to meet the requirements of the press molding station, so long as it does not interfere with discharge of the molded products from the press and does not interfere with lateral expansion of the tent 44 (see FIGS. 3 and 4) to maintain a generally constant tent volume when the press is closed. To meet the latter condition, it is preferred that any exhaust enclosure be of flexible material so that it can be kept inflated, as a part of tent 44, throughout the molding cycle.

I claim:

1. A mold atmosphere control system for a molding press of the kind comprising two platens, each bearing a mold half, cyclically movable between a closed molding position in which the mold halves are closed upon each other and an open discharge position in which the mold halves are substantially displaced from each other, the system comprising:

a tent formed of flexible sheet material;

mounting means for mounting the tent on the platens with the tent substantially enclosing the mold halves except for a bottom opening large enough to allow discharge of molded products formed in the press;

an gas diffuser mounted on one of the platens, within the tent;

and gas supply means, connected to the diffuser, for continuously supplying a stream of gas, under pressure, flowing through the diffuser into the tent and out through the bottom opening, the gas stream having a volume sufficient to maintaim the tent inflated throughout the mold cycle of the press.

2. A mold atmosphere control system according to claim 1, comprising air diffusers, each mounted on a respective one of the platens, the gas supply means being connected to both air diffusers.

3. A mold atmosphere control system according to claim 2, in which each diffuser encompasses at least three sides of a respective one of the mold halves.

4. A mold atmosphere control system according to claim 1 in which the gas supply means comprises an air dehumidifier and the stream of gas is a stream of warm, dry air.

5. A mold atmosphere control system according to claim 1, or claim 2, or claim 3, or claim 4, in which the tent is formed of at least partially transparent plastic film.

6. A mold atmosphere control system according to claim 5 in which the mounting means comprises a plurality of permanent magnets disposed along the outer surfaces of each end of the tent, each magnet holding a portion of one end of the tent on one platen by magnetic attraction.

7. A mold atmosphere control system according to claim 1, or claim 2, or claim 3, or claim 4, in which the mounting means comprises a plurality of permanent magnets disposed along the outer surfaces of each end of the tent, each magnet holding a portion of one end of the tent on one platen by magnetic attraction.

8. A mold atmosphere control system according to claim 4 for use with a molding press having mold halves that are cooled with chilled water from a chilled water supply, in which the air dehumidifier includes a moisture condensation coil for air dehumidification, and in which chilled water from the chilled water supply employed to cool the mold halves flows through the moisture condensing coil, thereby affording automatic dew point compensation for the system.

9. A mold atmosphere control system according to claim 8, in which the dehumidifier means further includes a passive refrigerant-filled vertical tube heat transfer coil having a lower evaportor section positioned upstream of the moisture condensation coil and an upper condensing section positioned downstream of the moisture condensation coil.

10. A mold dehumidification system according to claim 8 or claim 9 in which the tent is formed of at least partially transparent plastic film.

11. A mold atmosphere control system according to claim 1, or claim 2, or claim 3, for use with a press having a molded product handling apparatus located below the press platens, in which the tent extends below the platens on opposite sides of the product handling apparatus, to aid in guiding molded products into the product handling apparatus.

12. A mold atmosphere control system according to claim 11 in which the tent is formed of at least partially transparent plastic film.

13. A mold atmosphere control system according to claim 11, in which the mounting means comprises a plurality of permanent magnets disposed along the outer surfaces of each end of the tent, each magnet holding a portion of one end of the tent on one platen or one diffuser by magnetic attraction.

14. A mold atmosphere control system according to claim 11, for use with a molding press having mold halves that are cooled with chilled water from a chilled water supply, in which the gas supply means comprises an air dehumidifier which includes a moisture condensation coil for air dehumidification, and in which chilled water from the chilled water supply employed to cool the mold halves flows through the moisture condensing coil, thereby affording automatic dew point compensation for the system.

15. A mold atmosphere control system according to claim 14 in which the tent is formed of at least partially transparent plastic film.

16. The method of maintaining a controlled atmosphere encompassing the mold halves of a molding press of the kind including a molding station comprising two platens, each bearing a mold half, which platens move cyclically between a closed molding position in which the mold halves are closed upon each other and an open discharge position in which the mold halves are substantially displaced from each other, that method comprising:
  mounting a sheet of relatively light weight flexible sheet material on the two platens to form a tent extending between the platens and enclosing both mold halves, the bottom of the tent being open to permit discharge of gas and of products molded in the press;
  generating a stream of gas of controlled characteristics, under pressure;
  and continuously discharging the gas stream into the interior of the tent in sufficient volume to maintain the tent inflated throughout the molding cycle, despite substantial continuing gas loss through the open bottom of the tent, thereby maintaining a controlled atmosphere encompassing the mold halves.

17. The method of maintaining a controlled atmosphere encompassing the mold halves of a molding press, according to claim 16, in which a stream of gas is generated as a stream of warm, dry air, and the controlled atmosphere is a dehumidifed atmosphere precluding condensation of moisture on the mold halves.

18. The method of maintaining a controlled atmosphere encompassing the mold halves of a molding press, according to claim 16, or claim 17, in which the stream of gas is discharged into the tent from at least two locations, one adjacent each mold half.

19. The method of maintaining a controlled atmsophere encompassing the mold halves of a molding press, according to claim 18, in which the tent sheet is mounted on the platens by disposing a plurality of permanent magnets along the outer surfaces of each end of the sheet, each magnet holding a portion of one end of the sheet on one platen by magnetic attraction.

20. The method of maintaining a dehumidified atmosphere encompassing the mold halves of a molding press, according to claim 17, in which generation of the dehumidifying air stream includes passage of the air stream through a moisture condensation coil chilled by water from a chilled water supply that is also employed to cool the mold halves, thereby affording automatic dew point compensation.

21. The method of maintaining a controlled atmosphere encompassing the mold halves of a molding press, according to claim 16, or claim 17, or claim 20, in which a sheet of at least partially transparent plastic film is used to form the tent, thereby providing for continuous visual observation of operation of the molding station.

* * * * *